United States Patent [19]
Hsu

[11] Patent Number: 5,317,440
[45] Date of Patent: * May 31, 1994

[54] SINGLE WAVELENGTH BIDIRECTIONAL OPTICAL FIBER COMMUNICATION LINK

[75] Inventor: Huy-Pin Hsu, Northridge, Calif.

[73] Assignee: Hughes Aircraft Company, Los Angeles, Calif.

[*] Notice: The portion of the term of this patent subsequent to Apr. 9, 2008 has been disclaimed.

[21] Appl. No.: 526,427

[22] Filed: May 21, 1990

[51] Int. Cl.[5] ............................................. H04B 10/24
[52] U.S. Cl. ................................... 359/113; 359/124; 359/152
[58] Field of Search ................... 370/3; 455/618, 617, 455/606, 607; 359/113, 124, 133, 143, 152

[56] References Cited

U.S. PATENT DOCUMENTS

| | | | |
|---|---|---|---|
| 4,912,523 | 3/1990 | Refi et al. | 389/113 |
| 4,957,339 | 9/1990 | Fussgänger et al. | 455/617 |
| 5,005,936 | 4/1991 | Hsu | 389/124 |

FOREIGN PATENT DOCUMENTS

| | | | |
|---|---|---|---|
| 0337254 | 8/1989 | European Pat. Off. | |
| 2012293 | 9/1971 | Fed. Rep. of Germany | |
| 3506715 | 8/1986 | Fed. Rep. of Germany | 389/113 |
| WO8702531 | 4/1987 | PCT Int'l Appl. | |

OTHER PUBLICATIONS

7th European Conference on Optical Communiczation, ECOC 1981, Aug. 8, 1981 Denmark R. Ishikawa et al. 'Bidirectional LED-Spectrum Division Multiplexing Data Link with high stability'.

Japanese Patent Abstract vol. 10, No. 186 Sumitomo Electric Ind. Ltd.
Japanese Patent Abstract vol. 9, No. 85 Fujitsu.
"Electrical Communication", vol. 55, No. 4, 1980, "Bidirectional Optical Link" by W. Koester, I. Mohr (pp. 342-349).

Primary Examiner—Richard E. Chilcot, Jr.
Assistant Examiner—K. Negash
Attorney, Agent, or Firm—Charles D. Brown; Randall M. Heald; Wanda K. Denson-Low

[57] ABSTRACT

A single wavelength bidirectional communication link. The bidirectional communication link (100) includes an optical fiber (160) having a first and a second end. The present invention includes a first arrangement (260) for launching a first optical carrier of a first wavelength onto the optical fiber (160) at the first end thereof. Additionally, the first launching arrangement (260) impresses a first modulating signal having a frequency confined to a first frequency spectrum upon the first carrier. The inventive communication link (100) further includes a second arrangement (270) for launching a second optical carrier of the first wavelength onto the optical fiber (160) at the second end thereof. The second launching arrangement (270) also impresses a second modulating signal having a frequency confined to a second frequency spectrum not overlapping the first spectrum upon the second carrier. In addition, the present invention includes a first receiver (540), coupled to the second end of the optical fiber (160), for extracting the first modulating signal from the first optical carrier. A second receiver (480), coupled to the first end of the optical fiber (160), extracts the second modulating signal from the second optical carrier.

11 Claims, 3 Drawing Sheets

FIG. 1 *PRIOR ART*

SINGLE WAVELENGTH BIDIRECTIONAL OPTICAL FIBER COMMUNICATION LINK

BACKGROUND OF THE INVENTION

1. Field of the Invention

This invention relates to fiber-optic communication systems. More specifically, this invention relates to bidirectional signal transmission within such communication systems.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art

In certain remote-guidance systems communication with a guided vehicle is facilitated by an optical fiber linking the vehicle with a control station. The optical fiber is typically wound around a bobbin, or secured by other means capable of dispensing the fiber as the vehicle travels downrange. An optical carrier of a first wavelength is used to transport commands from the control station to the vehicle, while data from the vehicle is impressed upon an optical carrier of a second wavelength and carried by the fiber to the control station. Hence, bidirectional communication is effectuated in conventional fiber-optic systems by using optical energy at a pair of wavelengths to carry information in opposing directions.

Unfortunately, signal loss induced by the connecting fiber is typically minimized only at relatively long optical wavelengths. Since the optical carriers propagating in opposite directions along the link must generally be separated by a sufficient wavelength spacing to prevent channel cross-talk, the wavelength of both carriers may not be chosen to be near those of minimal signal loss. Accordingly, the signal transmission range of conventional dual-wavelength bidirectional optical fiber communication links is less than would be possible for a fiber link operative exclusively at a single wavelength of minimal signal loss.

Fiber-induced signal loss generally necessitates intermediate amplification in long range systems. However, in the conventional dual wavelength systems described above the transmitted light energy may not be directly amplified. This limitation arises because optical amplifiers are tuned to a single optical wavelength in order to provide maximum amplification. Accordingly, complex and expensive optical repeaters are used in lieu of optical amplifiers in conventional fiber-optic communication links. Optical repeaters operate by first converting the signals carried by the light energy back to the electrical domain. Next, these extricated electrical signals are superimposed upon a separately generated optical carrier. In addition, optical repeaters complicate system design as they often need to be included at multiple locations in very long-range fiber-optic links.

It follows that a need in the art exists for a long-range fiber-optic communication link which is operative at an optical carrier wavelength of minimal loss, and which maintains signal intensity through direct optical amplification rather than through the utilization of repeaters.

SUMMARY OF THE INVENTION

The need in the art for a bidirectional optical fiber link utilizing a single optical carrier at a wavelength of minimal fiber loss is addressed by the single wavelength bidirectional communication link of the present invention. The single wavelength operation of the present invention also allows for direct optical amplification and thereby obviates the need to employ complex optical repeaters. The bidirectional communication link of the present invention includes an optical fiber having a first and a second end. The present invention further includes a first arrangement for launching a first optical carrier of a first wavelength onto the fiber at the first end thereof. Additionally, the first launching arrangement impresses a first modulating signal having a frequency confined to a first frequency spectrum upon the first carrier.

The inventive communication link further includes a second arrangement for launching a second optical carrier of the first wavelength onto the fiber at the second end thereof. The second launching arrangement also impresses a second modulating signal having a frequency confined to a second frequency spectrum not overlapping the first spectrum upon the second carrier. In addition, the present invention includes a first receiver, coupled to the second end of the fiber, for extracting the first modulating signal from the first optical carrier. A second receiver, coupled to the first end of the fiber, extracts the second modulating signal from the second optical carrier.

DETAILED DESCRIPTION OF THE INVENTION

Figure 1:
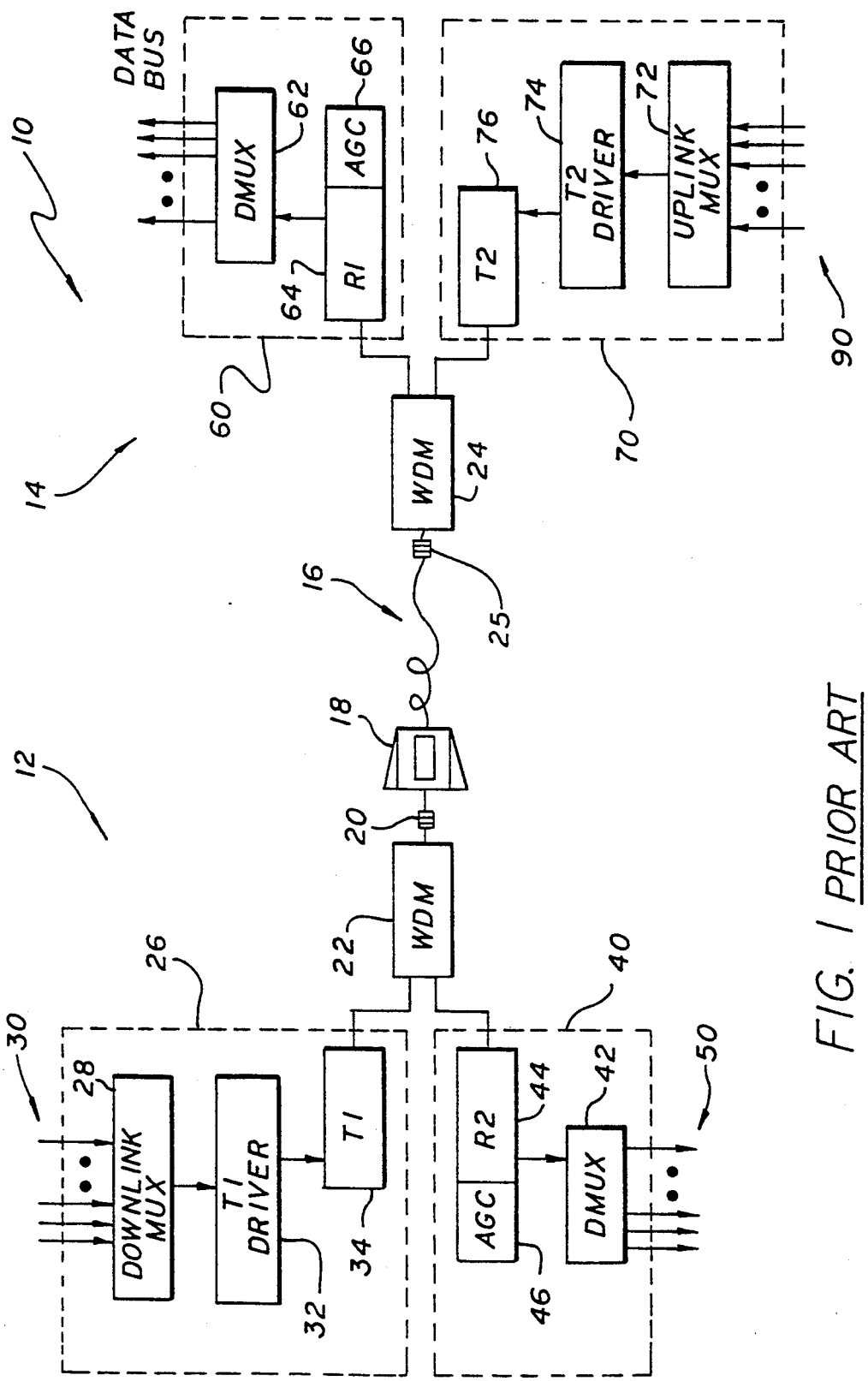
FIG. 1 is a block diagrammatic representation of a conventional electro-optical guidance system.

As shown in the block diagrammatic representation of FIG. 1, a conventional electro-optical guidance system 10 includes a vehicle subsystem 12, control station subsystem 14, and a fiber-optic link 16 therebetween. A bobbin 18 is connected to the fiber-optic cable 16 at one end thereof, and attached to the vehicle 12 by either an optical fiber connection or electro-mechanical coupler 20. The fiber optic cable 16 is initially wound around the bobbin 18, and is dispensed therefrom as the vehicle 12 moves away from the control station 14. The fiber connector or the electro-mechanical coupler 20 that enables rotation of the bobbin 18, while simultaneously allowing passage of light energy between the bobbin 18 and a first wavelength division multiplexer 22. The fiber-optic cable 16 is optically connected to a second wavelength division multiplexer 24 within the control station 14 through a fiber connector 25. The optical multiplexers 22 and 24 couple, to the fiber-optic cable 16, light energy of first wavelength W1 originating from within the vehicle 12 and light energy of a second wavelength W2 originating from within the control station 14.

The vehicle subsystem 12 includes a transmit section 26 and a receive section 40. The transmit section 26 includes a multiplexer 28 which accepts input from a multiple channel data bus 30 and outputs an electrical signal to a transmitter driver 32. Information carried on the data bus 30 may, for example, be composed of output signals from vehicle sensors or of status information from other electrical circuitry. As is known in the art, the multiplexer 28 interleaves inputs from the data bus 30 and produces a composite electrical signal for input to the transmitter driver 32. The transmitter driver 32 includes circuitry for biasing an injection laser diode or light emitting diode (LED) included within a first transmitter 34 and for relaying the composite signal from the multiplexer 28. The transmitter 34 generates an optical carrier of center wavelength W1, with the wavelength of the carrier being modulated about the value W1 by the driver 32. The modulated carrier is then coupled to the optical fiber 16 via the multiplexer 22 and sent to the control station 14.

The receive section 40 includes a demultiplexer 42, a receiver 44 and associated automatic gain control circuitry 46. The receiver 44 accepts optical signals from the optical multiplexer 22. Typically, a photodiode within the receiver 44 produces an electrical signal of amplitude proportional to the optical signal power impinging thereon. The AGC circuitry 46 compensates for fluctuations in the electrical signal power in the receiver 44. The receiver 44 may include demodulation or frequency conversion circuitry for processing the signal prior to sending it to the demultiplexer 42. The demultiplexer 42 performs the converse function of the multiplexer 28; namely, the demultiplexer 42 accepts a composite electrical signal and separates the signal into fundamental constituents. These component signals are then routed to their respective channels on a data bus 50.

The control station 14 includes a receive section 60 and transmit section 70. The receive section 60 includes a demultiplexer 62 and a receiver 64 with associated AGC circuitry 66. The receiver 64 accepts optical signals from the optical multiplexer 24. The receiver 64 typically includes a photodiode which produces an electrical signal of amplitude proportional to optical power of the received signal. The AGC circuitry 66 compensates for fluctuations in electrical signal level in the receiver 64. The receiver 64 may also include demodulation or frequency conversion circuitry for processing the signal prior to sending it to the demultiplexer 62.

The transmit section 70 includes a control station multiplexer 72 which combines excitations from a multichannel data bus 90 into an electrical signal delivered to a control station transmitter driver 74. The transmitter driver 74 includes circuitry for biasing an injection laser diode or light emitting diode (LED) within a control station transmitter 76 and for relaying the composite signal from the multiplexer 72. The transmitter 76 generates an optical carrier of center wavelength W2, with the wavelength of the carrier being modulated about the value W2 by the driver 74. The modulated carrier is then coupled to the optical fiber 16 via the optical multiplexer 24 and sent to the vehicle 12.

It is thus apparent that the conventional guidance system 10 effects bidirectional communication through the fiber 16 by utilizing a pair of optical carriers centered at the wavelengths W1 and W2. However, minimum signal loss through the fiber 16 typically only occurs at relatively long wavelengths (i.e. at greater than approximately 1300 nm. for certain commercially available fibers), and thus the signal transmission range of the system 10 is reduced to the extent that either W1 or W2 depart from this wavelength spectrum of minimum loss. In addition, as mentioned in the Background of the Invention the employment of more than a single carrier wavelength precludes direct optical amplification along the fiber 16 and necessitates utilization of complex optical repeaters for signal augmentation. Further, additional transmission channels may not be conveniently added to the system 10 as each new channel would require the inclusion of a separate carrier wavelength. Each supplemental carrier (channel) would require a separate laser diode operative at the new carrier wavelength, a separate receiving subsystem, and would further require that the multiplexers 22 and 24 be adapted to separate more than two channels.

Figure 2:
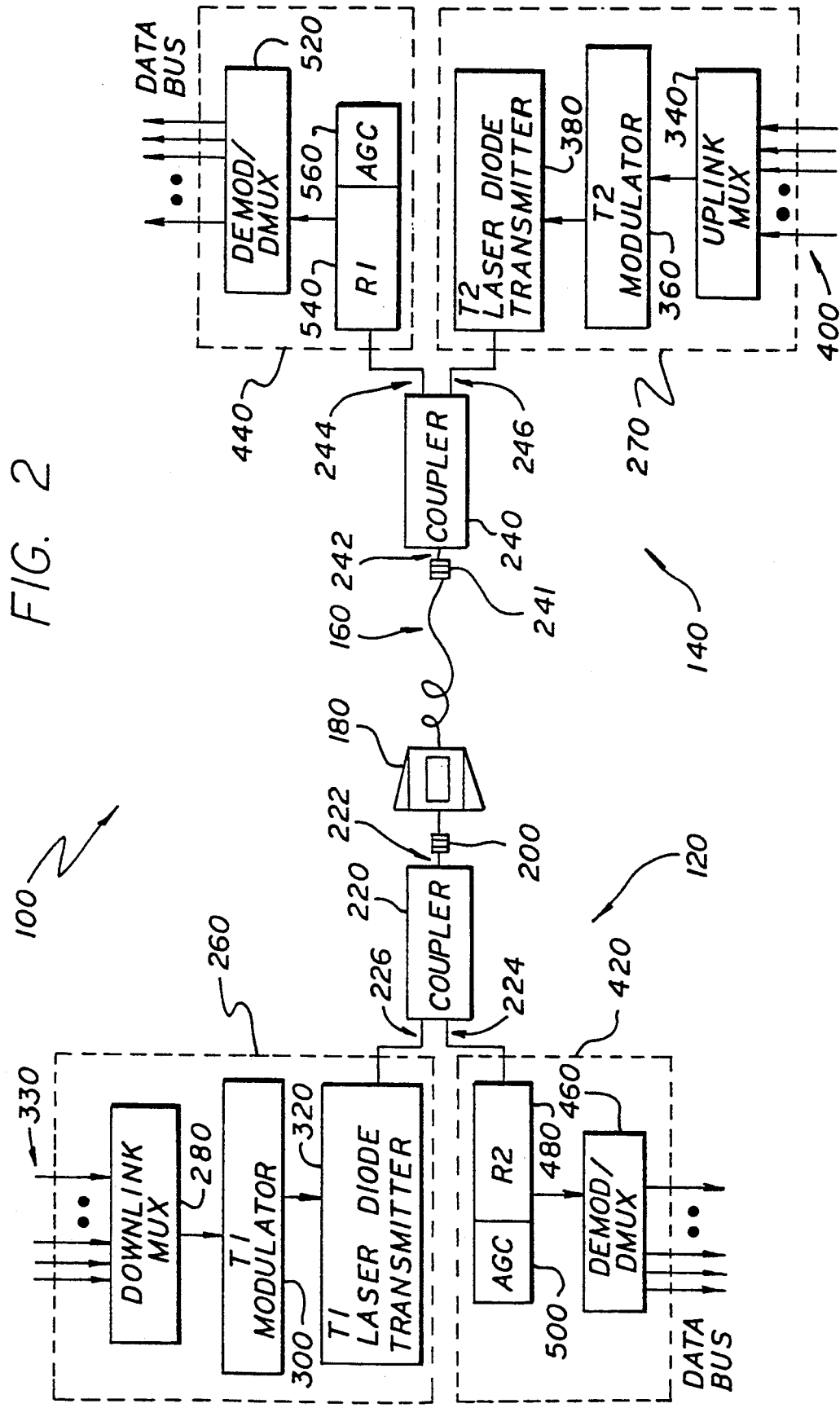
FIG. 2 is a block diagram of a preferred embodiment of the single wavelength bidirectional optical fiber communication link of the present invention.

A preferred embodiment of the single wavelength bidirectional optical fiber communication link 100 of the present invention is shown in the block diagrammatic representation of FIG. 2. The present invention substantially overcomes the constraints imposed by the conventional guidance system 10 on signal transmission range and multi-channel capability by facilitating communication between a vehicle subsystem 120 and control station subsystem 140. This communication is facilitated by an optical fiber 160 which transmits an optical carrier in each direction, with each carrier centered at a wavelength W—preferably a wavelength of minimal fiber loss. As will be discussed more fully below, signals sent from the vehicle 120 to the control station 140 occupy a first frequency spectrum and those sent in the opposing direction are confined to a well-segregated or non-overlapping second frequency spectrum. The signals propagate along the fiber 160 via oppositely traveling optical carriers each modulated about the wavelength W. In contrast to the prior art system 10 which utilizes a pair of optical carrier wavelengths, the present invention effects bidirectional data transmission along an optical fiber using a pair of optical carriers centered at a common wavelength W—thereby enhancing signal transmission range when the wavelength W is chosen to be one of minimal fiber loss.

As shown in FIG. 2, a bobbin 180 is connected to the fiber-optic cable 160 at one end thereof, and attached to the vehicle subsystem 120 by a first optical fiber connector 200. The fiber-optic cable 160 is initially wound around the bobbin 180, and is dispensed therefrom as the vehicle 120 moves away from the control station 140. Again, the connector 200 allows the passage of light energy between the bobbin 180 and an optical fiber directional coupler 220. The fiber coupler has first, second and third ports 222, 224, 226 and is disposed to split optical power entering the first port 222 between the second and third ports 224, 226. The directivity (ratio of optical energy between the second and third ports 224, 226 with optical energy incident from the second port 224) of commercially available fiber optic couplers such as the coupler 220 is approximately 60 to 70 db.

The fiber-optic cable 160 is optically connected to a control station optical fiber directional coupler 240 through a second optical fiber connector 241. The coupler 240 is substantially identical to the coupler 220 and has first, second and third ports 242, 244, 246. Again, optical power entering the first port 242 is split between the second and third ports 244, 246.

Disposed within the vehicle subsystem 120 and control station 140 are first and second transmit sections 260 and 270, respectively. The first transmit section 260 includes a downlink multiplexer 280, a transmitter modulator 300, and a laser diode transmitter 320. The multiplexer 280 accepts input from a multiple channel data bus 330 and outputs a multiplexed electrical signal to the modulator 300. The modulator 300 includes circuitry for generating a digital waveform of a known frequency in response to the data stream from the multiplexer 280. For example, it may be desired to translate a 1 Mb/s data rate from the multiplexer 280 into a digital waveform having a frequency of 1 GHz. In this instance the digital waveform would be synthesized by the modulator 300 by frequency modulating a 1 GHz analog signal across a first frequency spectrum (e.g. 800 MHz to 1.2 GHz). The digital waveform from the modulator 300 is used to modulate the wavelength of an optical carrier centered at the wavelength W produced by a laser diode or light emitting diode within the laser diode transmitter 320. This modulated optical carrier is then launched onto the optical fiber 160 via the fiber coupler 220. In this manner an analog or digital downlink signal D confined to a first frequency spectrum is transmitted from the vehicle subsystem 120 to the control station subsystem 140 by modulating an optical carrier about the wavelength W.

Similarly, the second transmit section 270 includes a control station uplink multiplexer 340, a control station transmitter modulator 360, and a control station laser diode transmitter 380. Again, the multiplexer 340 accepts input from a multiple channel data bus 400 and outputs a multiplexed electrical signal to the modulator 360. The modulator 360 includes circuitry for generating a digital waveform of a known frequency in response to the data stream from the multiplexer 340. For example, it may be desired to translate a 100 Mb/s data rate from the multiplexer 340 into a digital waveform having a frequency of 4 Ghz. In this instance the digital waveform would be synthesized by the modulator 360 by frequency modulating a 4 Ghz analog signal across a second frequency spectrum (e.g. 3.8 GHz to 4.2 GHz). The digital waveform from the modulator 360 is used to modulate the wavelength of an optical carrier centered at the wavelength W produced by a laser diode or light emitting diode within the laser diode transmitter 380. This modulated optical carrier is then launched onto the optical fiber 160 via the fiber coupler 240. In this way an analog or digital uplink signal U confined to a second frequency spectrum—distinct from the first frequency spectrum—is transmitted from the control station subsystem 140 to the vehicle subsystem 120 by modulating an optical carrier about the wavelength W.

Disposed within the vehicle subsystem 120 and the control station subsystem 140 are first and second receive sections 420 and 440, respectively. The first receive section 420 includes a demodulator/demultiplexer 460, and receiver 480 with associated AGC circuitry 500. As shown in FIG. 2, the optical waveform carrying the uplink signal U is relayed from the optical fiber 160 to the receiver 480 through the coupler 220. The receiver 480 includes a photodetector which generates an electrical signal in response to the incident optical waveform. The AGC circuitry 500 then compensates for fluctuations in the power of this electrical signal. The electrical signal from the photodetector is next routed to a filter circuit having a passband encompassing the second frequency spectrum, and having a stopband which includes the first frequency spectrum. The receiver 480 is thus designed to recover the uplink signal U from an optical carrier and to suppress signals, including the downlink signal D, having spectral components outside of the second frequency spectrum.

The second receive section 440 within the control station 140 is similarly configured. Specifically, the second receive section 440 includes a second demodulator/demultiplexer 520, and a second receiver 540 with associated AGC circuitry 560. As shown in FIG. 2, the optical waveform carrying the downlink signal D is relayed from the optical fiber 160 to the receiver 540 through the coupler 240. Again, the receiver 540 includes a photodetector which generates an electrical signal in response to the incident optical waveform. The AGC circuitry 560 compensates for fluctuations in the power of this electrical signal. The electrical photodetector signal is then fed to a filter circuit having a passband encompassing the first frequency spectrum, and a stopband which includes the second frequency spectrum. The receiver 540 is thus designed to recover the downlink signal D from an optical carrier and to suppress signals, including the uplink signal U, having spectral components outside of the first frequency spectrum.

Figure 3A:
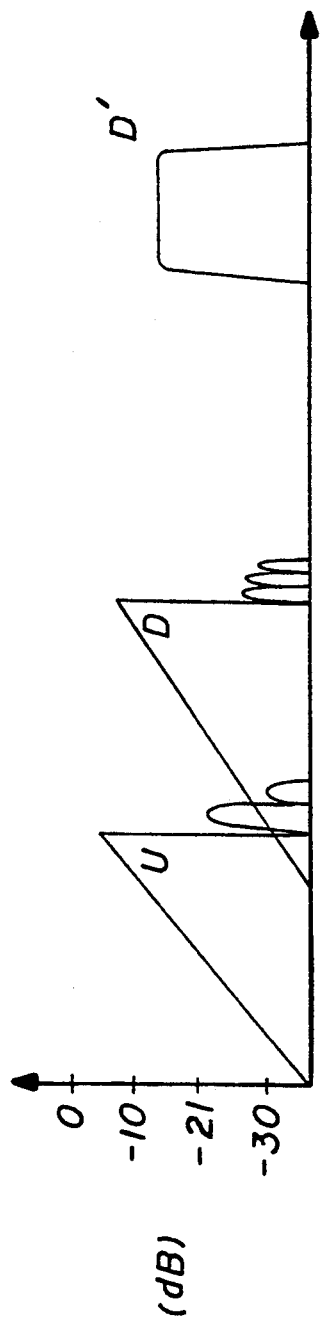
FIG. 3 is a graphical representation of the spectral power densities of an uplink signal U and downlink signal D as a function of frequency.
Figure 3B:
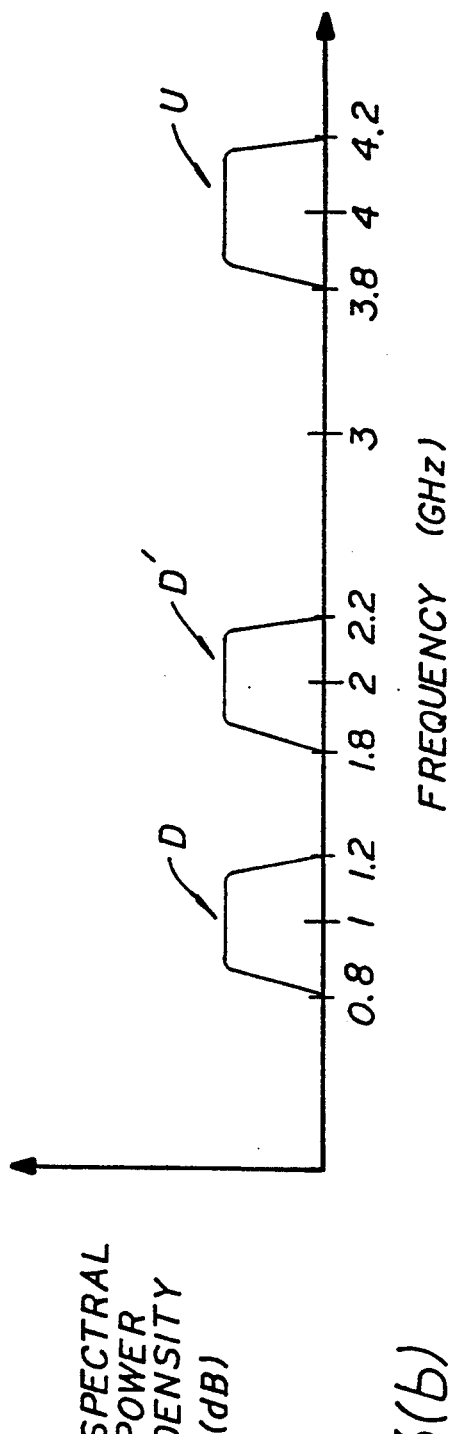

FIG. 3 graphically represents the spectral power densities of the uplink signal U and downlink signal D as a function of frequency. With proper encoding scheme used to encode two digital channels with a large data rate difference, as shown in FIG. 3(b), the respective spectra of the uplink U and downlink D signals do not overlap. As a consequence, the uplink U and downlink D signals may be transmitted through the optical fiber 160 by optical carriers centered at a common wavelength without engendering signal crosstalk. Moreover, additional communication channels may conveniently be added to the system 100. For example, as shown in FIG. 3 a second downlink channel (signal) D' centered at 2 GHz and extending from 1.8 GHz to 2.2 GHz could be added to the system 100 without interfering with signals in the uplink U or original downlink D frequency bands. This addition simply requires that the passband of the filter included within the control station receiver 540 be extended to 2.2 GHz, and that the stopband of the filter included within the receiver 480 exhibit sufficient rejection at 2.2 GHz. In contrast, the addition of a channel to the prior art system 10 requires a concomitant expansion in the number of optical carrier wavelengths. Such an expansion will generally require not only an additional optical receiver, but also modification of the optical multiplexers in order to accommodate more than two optical wavelengths and augmentation of a transmitter to include a laser diode operative at the added wavelength.

While the present invention has been described herein with reference to a particular embodiment, it is understood that the invention is not limited thereto. The teachings of this invention may be utilized by one having ordinary skill in the art to make modifications within the scope thereof. For example, the invention is not limited to the particular transmit and receive electronics disclosed herein. Other suitable electronic circuit configurations may be employed to generate a modulated optical carrier, and to extract a modulation waveform therefrom upon detection thereof without departing from the scope of the present invention. Further, optical couplers dividing optical power between the second and third ports asymmetrically may be substituted for the 3 dB optical coupler included in the embodiment of FIG. 2. In addition, the teachings of the present invention embrace either analog or digital uplink and downlink signals, and also encompass frequency spectra other than those specified by FIG. 3. It is therefore contemplated by the appended claims to cover any and all such modifications.

Accordingly, what is claimed is:

1. A bidirectional communication link comprising:
   an optical fiber having a first and a second end;
   first means for launching a first optical carrier of a first wavelength onto said fiber at said first end thereof, said first launching means including means for impressing a first modulating signal confined to a first frequency spectrum upon said first carrier;
   second means for launching a second optical carrier of said first wavelength onto said fiber at said second end thereof, said second launching means including means for impressing upon said second carrier a second modulating signal confined to a second frequency spectrum not overlapping said first spectrum;
   first receiver means, coupled to said second end of said fiber, for extracting said first modulating signal from said first optical carrier; and
   second receiver means, coupled to said first end of said fiber, for extracting said second modulating signal from said second optical carrier.

2. The communication link of claim 1 wherein said first launching means further includes means for impressing upon said first carrier a third modulating signal confined to a third frequency spectrum not overlapping said first or second frequency spectra and wherein said first receiver means further includes means for extracting said third modulating signal from said first optical carrier.

3. A bidirectional communication link comprising:
   an optical fiber having a first and a second end;
   first transmitter means for generating a first optical carrier of a first wavelength;
   first modulator means for modulating said first optical carrier with a first modulating signal confined to a first frequency spectrum;
   second transmitter means for generating a second optical carrier at said first wavelength;
   second modulator means for modulating said second optical carrier with a second modulating signal confined to a second frequency spectrum not overlapping said first frequency spectrum;
   first receiver means for extracting said first modulating signal from said first optical carrier;
   second receiver means for extracting said second modulating signal from said second optical carrier;
   first coupling means for coupling said first transmitter means and said second receiver means to said first end of said optical fiber; and
   second coupling means for coupling said second transmitter means and said first receiver means to said second end of said optical fiber.

4. The bidirectional communication link of claim 3 wherein said first receiver means includes:
   a first photodetector; and
   a first filter circuit coupled to said first photodetector, said first filter having a passband encompassing said first frequency spectrum.

5. The bidirectional communication link of claim 4 wherein said second receiver means includes:
   a second photodetector; and
   a second filter circuit coupled to said second photodetector, said second filter having a passband encompassing said second frequency spectrum.

6. In a system including a vehicle, a control station, and an optical fiber therebetween, a bidirectional communication link comprising:
   bobbin means for coupling a first end of said optical fiber to said vehicle;
   first means, included within said vehicle, for launching a first optical carrier of a first wavelength onto said fiber, said first launching means including means for impressing a first modulating signal confined to a first frequency spectrum upon said first carrier;
   second means, included within said control station, for launching a second optical carrier of said first wavelength onto said fiber at a second end thereof, said second launching means including means for impressing upon said second carrier a second modulating signal confined to a second frequency spectrum not overlapping said first spectrum;
   first receiver means, included within said vehicle, for extracting said first modulating signal from said first optical carrier; and
   second receiver means, included within said control station, for extracting said second modulating signal from said second optical carrier.

7. In a system including a vehicle, a control station, and an optical fiber therebetween, a bidirectional communication link comprising:
   bobbin means for coupling a first end of said optical fiber to said vehicle;
   first transmitter means, included within said vehicle, for generating a first optical carrier of a first wavelength;
   first modulator means for modulating said first optical carrier with a first modulating signal confined to a first frequency spectrum;
   second transmitter means, included within said control station, for generating a second optical carrier at said first wavelength;
   second modulator means for modulating said second optical carrier with a second modulating signal confined to a second frequency spectrum not overlapping said first frequency spectrum;
   first receiver means, included within said control station, for extracting said first modulating signal from said first optical carrier;
   second receiver means, included within said vehicle, for extracting said second modulating signal from said second optical carrier;
   first coupling means for coupling said first transmitter means and said second receiver means to said bobbin means; and
   second coupling means for coupling said second transmitter means and said first receiver means to a second end of said optical fiber.

8. The bidirectional communication link of claim 7 wherein said first receiver means includes:
   a first photodetector; and
   a first filter circuit coupled to said first photodetector, said first filter circuit having a passband encompassing said first frequency spectrum.

9. The bidirectional communication link of claim 8 wherein said second receiver means includes:
   a second photodetector; and
   a second filter circuit coupled to said second photodetector, said second filter circuit having a passband encompassing said second frequency spectrum.

10. A method of contemporaneously transmitting signals having optical carriers of a common wavelength along an optical fiber comprising the steps of:
   a) generating a first optical carrier of a first wavelength;
   b) modulating said first optical carrier with a first modulating signal confined to a first frequency spectrum;
   c) launching said modulated optical carrier onto said optical fiber at a first end thereof;
   d) generating a second optical carrier at said first wavelength;
   e) modulating said second optical carrier with a second modulating signal confined to a second frequency spectrum
   f) launching said second modulated optical carrier onto said optical fiber at a second end thereof;
   g) extracting said first modulating signal from said first optical carrier;
   h) extracting said second modulating signal from said second optical carrier.

11. The method of claim 10 further including the steps of:
   a) modulating said first optical carrier with a third modulating signal confined to a third frequency spectrum not overlapping said first or second spectra;
   b) extracting said third modulating signal from said first optical carrier.

* * * * *